(12) United States Patent
MacGregor et al.

(10) Patent No.: US 6,685,281 B2
(45) Date of Patent: Feb. 3, 2004

(54) PARKING BRAKE CONTROL SYSTEM

(75) Inventors: G. David MacGregor, Eagle, ID (US); Noble Hamilton, Eagle, ID (US)

(73) Assignee: 55 Brake Company, Boise, ID (US)

( * ) Notice: Subject to any disclaimer, the term of this patent is extended or adjusted under 35 U.S.C. 154(b) by 0 days.

(21) Appl. No.: 10/171,090

(22) Filed: Jun. 11, 2002

(65) Prior Publication Data

US 2003/0006644 A1 Jan. 9, 2003

Related U.S. Application Data

(63) Continuation-in-part of application No. 09/724,761, filed on Nov. 28, 2000, now Pat. No. 6,450,587, which is a continuation-in-part of application No. 09/521,824, filed on Mar. 9, 2000, now Pat. No. 6,322,161, which is a continuation-in-part of application No. 09/108,863, filed on Jul. 1, 1998, now abandoned, application No. 10/171,090.
(60) Provisional application No. 60/297,622, filed on Jun. 13, 2001, and provisional application No. 60/297,682, filed on Jun. 11, 2001.

(51) Int. Cl.[7] .................................................. B60T 7/20
(52) U.S. Cl. ............................ 303/123; 303/7; 303/20; 303/89
(58) Field of Search ........................ 303/3, 7, 9, 9.63, 303/15, 123, 191, 193, 20, 89

(56) References Cited

U.S. PATENT DOCUMENTS

| | | | | |
|---|---|---|---|---|
| 3,000,459 A | * | 9/1961 | Silver et al. | 180/273 |
| 3,174,502 A | * | 3/1965 | Howarth et al. | 137/351 |
| 2002/0140282 A1 | * | 10/2002 | Costa | 303/7 |
| 2003/0052532 A1 | * | 3/2003 | Costello et al. | 303/7 |

FOREIGN PATENT DOCUMENTS

| | | | |
|---|---|---|---|
| DE | 4342543 | * | 6/1995 |
| GB | 2205620 | * | 12/1988 |
| GB | 2265679 | * | 10/1993 |
| GB | 2340902 | * | 3/2000 |

* cited by examiner

Primary Examiner—Chris Schwartz
Assistant Examiner—Devon Kramer
(74) Attorney, Agent, or Firm—Pedersen & Co. PLLC; Ken J. Pedersen; Barbara S. Pedersen

(57) ABSTRACT

A brake control device prevents movement of a vehicle, when an unsafe condition exists, by automatically applying the parking or other brake. The brake control system may prevent movement should the unsafe condition exist within, on or around, a towed device such as a trailer, a trailer-house or other recreational or non-recreational equipment. The brake control system may set a brake or parking device on the towed device whenever the towed device is disconnected from the motorized vehicle, or whenever equipment on the towed vehicle is extending outward or is otherwise un-stowed in a position unsafe for traveling, whether or not the towed vehicle is connected to the towing vehicle. Interface connections from the towed device to the powered towing vehicle may include wireless, electrical wire, fiber optics, analog, digital, or others. The preferred brake control system separates the controller and electronic operator switch and light/indicia that are handled or viewed by the driver from the actuation system that applies or locks the brakes, to use space more efficiently and to improve braking response time. These signals, such as electronic/electric/optic/wireless signals, travel between the cab and the brake management equipment to apply and release the brakes, and may be much more compact and more easily routed or transmitted through a vehicle than conventional air/hydraulic lines.

18 Claims, 9 Drawing Sheets

PARKING BRAKE CONTROL SYSTEM

DESCRIPTION

This application claims priority of provisional applications Serial No. 60/297,682, filed Jun. 11, 2001, and Serial No. 60/322,371, filed Sep. 3, 2001, and this application is a continuation-in-part of U.S. patent application Ser. No. 09/724,761, filed Nov. 28, 2000 now U.S. Pat. No. 6,450,587, which is a continuation-in-part of U.S. patent application Ser. No. 09/521,824, filed Mar. 9, 2000, (U.S. Pat. No. 6,322,161 issued Nov. 27, 2001) entitled "Apparatus and Methods for Automatic Engagement and Locking of Vehicle Air Parking Brake," which is a continuation-in-part of prior application Ser. No. 09/108,863, filed Jul. 1, 1998 now abandoned, and entitled "Automatic Air Parking Brake Lock," which applications are herein incorporated by reference.

BACKGROUND OF THE INVENTION

1. Field of the Invention

This invention generally relates to braking systems for vehicles, such as buses, semi-tractor and trailers, and passenger vehicles. More particularly, this invention relates to a control system for automatically applying and maintaining a vehicle brake in the applied condition during times when it is unsafe or undesirable for the vehicle to move. The invention relates to a control system that may also lock the brake when an unsafe condition begins after the parking brake has been applied by the driver. Further, the invention relates to providing an electric/electronic switch for operation by the driver, replacing conventional manual hand and foot handles that must be pushed or pulled to set or release the parking brake. The invention also relates, in its preferred embodiments, to providing a system that responds to various signals on or away from the vehicle to control a parking brake on a remote piece of equipment, such as on a trailer, camper, or other towed vehicle.

The invention may be adapted for use with brakes of various types, for example, air parking brakes or mechanical parking brakes, or by adapting a hydraulic "application" brake, an air "application" brake, or an electric brake to serve as a parking brake. While the invention is primarily focused on parking brake improvement, the invention may be used, in some embodiments, to apply and control application brakes.

The automatic application and locking of a vehicle brake may be actuated by signals from various sensors/switches inside and outside the vehicle. In a preferred embodiment, the invention relates to a controller that automatically applies a parking brake when certain conditions are sensed in or around the vehicle, as long as the vehicle is not already moving at a speed that is judged as too fast for safe parking brake engagement and, preferably, as long as the sensed condition signals are validated.

2. Related Art

Commercial and public transportation vehicles typically utilize the following types of conventional brakes:

1) Air parking brakes utilize an air-controlled spring system that cooperates with the brake shoes of a vehicle's back wheels. Air parking brake systems exist in commonly-used commercial vehicles, such as trucks, commercial buses, or school buses. The air parking brake system comprises an air source, the spring mechanism, and an air control valve called an "air loading valve" between the air source and the spring mechanism. The air loading valve is controlled only by a manual handle, which is in the vehicle cab on the dashboard or in other positions accessible to the operator. The loading valve manual handle works in a "Pull To Apply" and "Push To Release" manner. Pulling the handle closes the air loading valve, whereby air pressure from the air source is blocked and downstream air pressure is vented so that the springs move to a position that applies the brake. Pushing the handle opens the air loading valve and closes the vent, whereby air is supplied to the spring mechanism so that the springs move to a position that releases the brake.

The loading valve and its handle are located at the dashboard of the vehicle in the cab. The loading valve is very close to the driver, located just under the dashboard, with its handle protruding through the dashboard for access by the driver. Because of this location, the air lines to and from the loading valve travel typically from the rear of the vehicle all the way to the cab and into the space under the dashboard. This creates very long air lines, substantially the entire length of the vehicle, and a very crowded situation under the dashboard. The air lines in large vehicles often are as long as 30 feet or more.

2) Air application brakes, sometimes called "foundation brakes," are the conventional means, in vehicles with air brakes, to slow and stop the vehicle, for example, during normal "stop and go" driving. The "air application brakes" are operated by a foot-actuated air control valve, which allows incremental application of the brakes depending on how far the operator has pushed on the foot pedal.

3) Mechanical parking brakes utilize a mechanical linkage or a cable, to operatively connect a manual handle in the vehicle cab either to brake shoes at the rear wheels, or to external brake bands or internal brake shoes working with a brake drum mounted on the drive line. The manual handle is typically either a pull-on hand-operated handle, or a push-on foot-operated handle.

4) Hydraulic "application" (or "foundation") brakes are the conventional means, in vehicles with mechanical parking brakes, to slow and stop the vehicle during normal driving. A hydraulic application brake system typically comprises a master brake cylinder for applying hydraulic force to brake shoes at the wheels, and a manual foot-pedal for actuating the master cylinder. Pushing on the brake pedal causes the brake cylinder to increase the fluid pressure in the line to the brake shoes at the wheel, which inhibits the rotation of the wheel to an incremental amount depending on how far the operator has pushed on the brake pedal. When the pedal is released, the master cylinder retracts to reduce or eliminate the pressure in the brake line, disengaging the brake shoe pads from contact with the brake drum and thereby allowing unhindered rotation of the wheel. Hydraulic application brakes are used in most family cars, sport utility vehicles, pick-ups, vans, and larger vehicles such as some school buses.

Crowded Equipment and Slow Operation

Conventional brake systems as described above involve manual control/operation by a driver in the cab. Therefore, the conventional systems place substantial amounts of the equipment, for the control/operation in the cab, typically at/in the dashboard or close to the driver's hands or feet. This causes air lines, hydraulic lines, or mechanical linkages to be crowded into spaces in the cab, and the air, hydraulic lines, or cables to extend for long distances from the cab to the brake mechanisms at the wheels. Not only does this result in crowded or inconveniently-placed equipment and lines, but also in delayed actuation of brakes as the forces applied in the cab travel through long fluid lines to the vicinity of the brakes. For example, extra turns or sharper turns in an air parking brake line have been known to delay the braking response, after the driver has moved his arm to pull the air loading valve handle. Such delays can be longer than acceptable according to safety requirement for commercial or passenger vehicles.

Regarding Vehicle Movement during Unsafe Conditions

Conditions may exist in or around a vehicle that make it unsafe for the vehicle to be in motion. Conventional safeguards against vehicle movement when such a condition exists are inadequate, at least in part because the safeguards typically depend on the driver taking appropriate action. This invention, without requiring driver action or involvement, automatically detects such conditions and automatically applies or locks the brakes, thereby preventing potentially unsafe vehicle movement.

Vehicle movement when conditions exist that potentially make such movement unsafe are generally the result of (1) the driver's failure to properly apply or engage the parking brake or application/foundation brake system, (2) a third party's intentional release or interference with the parking brake, or (3) the driver's failure, whether intentional or inadvertent, to detect and/or react to conditions which may make vehicle movement unsafe.

Examples of potentially dangerous conditions where movement of a vehicle may be unsafe include but are not limited to the following:

- A driver leaves a vehicle, or is otherwise not in a position to safely operate the vehicle and fails to properly set the parking brake.
- A driver attempts to put a vehicle in motion when people are attempting to enter or leaving the vehicle.
- A driver attempts to put a vehicle in motion with a door open, wheel chair ramp in use, luggage compartment unlatched, or other equipment similarly not in a safe operating mode.
- A driver puts a vehicle in motion when an object is in close proximity creating the potential for a collision. Examples include a driver failing to notice a pedestrian stepping in front of a bus or a child playing behind a parked car.
- A driver's ability to recognize the existence of an unsafe condition is impaired. Examples include radio noise masking the warning whistle of a train at a railroad crossing, a driver who is intoxicated, or a passenger who has not fastened safety restraints.
- A vehicle that is approaching too close to an object, such as a truck backing up to a loading platform.
- A vehicle with equipment that has failed or is not within acceptable safety ranges, such as loss of tire or oil pressure.
- An unauthorized driver is attempting to move or steal the vehicle.

Conventional "Push-Pull" Parking Brake Handles

Conventional parking brake systems include a manual handle mounted in the vehicle cab that applies the parking brake via mechanical linkage between the manual handle and the brake or via mechanical linkage between the manual handle and the air valve that actuates the air parking brake. In the case of most buses, this handle is a hand-operated push-pull loading valve handle extending from the air loading valve and through the dashboard. In the case of passenger vehicles, this handle is a hand-operated lever located between the front seats that is pulled up and rearward to apply the parking brake, and then is pushed down, typically after pressing a button on the handle, to release the brakes. Or, a foot-operated pedal is located near the driver's compartment floor, and a hand-operated release handle is pulled to release the parking brake.

In any event, these structures may be called "mechanical hand or foot handles" and they may also be termed "push-pull" handles, because they require significant manual strength and significant movement of the hand or foot to pull the handle enough to securely apply the brake. Then, it requires at least as much strength and movement of the hand or foot to release the brake. Nearly every passenger car driver has been in the position of struggling with the parking brake lever, foot pedal, and/or the brake release handle.

OBJECTS OF THE PRESENT INVENTION

There is a need for a versatile, reliable brake control system that is compatible with various types of existing brake technology. There is still a need for a comprehensive automatic brake control system that prevents vehicle movement during potentially unsafe conditions at various stations inside, outside, or around the vehicle, and to better inform the vehicle operator of the potentially unsafe conditions. There is a need for a control system that automatically applies a brake and "locks" it in the "on" condition throughout the duration of potentially unsafe situations, and that also prevents automatic setting of the brake while the vehicle is traveling. There is a need for such a system that validates signals coming to the controller to prevent noise, equipment vibration, or other errors from applying the brake in error. There is a need for such a control system that does not require driver action or involvement, but that does allow an authorized driver to override the automatic systems under some circumstances.

There is a need for a more ergonomic parking brake system that replaces the clumsy and uncomfortable conventional brake handles with an electric/electronic parking brake switch that is easily operated even by individuals without great strength. There is a need for a controller and electric/electronic switch combination that allows the driver to retain control of the parking brake when none of the conditions exist that have been predetermined to be those that automatically apply the brake, and that allows the driver to temporarily release the brake to allow movement of the vehicle to a safe location for repair.

Also, there is a need for a brake control system that locates as much as possible of the brake control system equipment out of the cab and closer to the brakes at the wheels. There is a need for a system that shortens the fluid lines in air and/or hydraulic systems and speeds up the braking response because of shorter lines and high-speed signals and control.

SUMMARY OF THE INVENTION

The present invention is a parking brake control system that automatically detects potentially unsafe conditions and then enhances safety by automatically applying a brake and maintaining the brake in the applied position ("locking the brake") and/or by controlling other equipment. An object of the present invention is to provide an automatic control system that requires little driver action or involvement, but that allows the driver to more comfortably control the parking brake when there are no unsafe conditions sensed by the controller, or when an unsafe condition has applied the parking brake but the vehicle must be moved to a safer location. An object of the invention is to enable sensors to detect the potentially unsafe conditions in or around the vehicle, to automatically alert the driver to the existence of such conditions through visual and/or audio or other means, and, when appropriate, to automatically control the brakes and/or other equipment. Potentially dangerous conditions may include, for example: 1) equipment-related conditions such as a driver exiting the vehicle without applying the parking brake or without turning off the vehicle; operating a disabled person's lift; passengers entering and exiting the vehicle; engine or other vehicle malfunctions detected by diagnostic sensors; or a driver being distracted by radios, cell-phones, or monitor screens; or 2) undesirable-or dangerous-driver-related conditions such as a driver failing a breath alcohol test or an identity test.

An important object of the invention is to improve the ergonomics of parking brake operation, by providing a parking brake driver's switch that allows push-button operation rather than push-pull operation of handles mechanically linked to the parking brake. Other objects of the invented control system may include preventing the brake from being automatically set while the vehicle is moving, and validating signals to the controller so that noise and other false signals do not cause the brake to be applied.

As a result of these and other objects of the invention, the invented system allows a vehicle operator to focus more on safe driving and vehicle operation, whether traveling or parked, and on the surrounding conditions, rather than on repeated manual operation of the parking brake, and repeated checking of the parking brake handle position. With fewer distractions, and fewer responsibilities for accidental misuse or release of the parking brake, the vehicle operator can perform his/her job more safely. Further, elimination of the frequent pulling and pushing of the parking brake manual handle may reduce carpal tunnel syndrome or other discomforts and injuries in veteran drivers.

The invented control system comprises a "management mechanism" for applying a brake, a controller with the logic that decides when the brake should be applied and that electronically actuates the management system to apply the brake, and various circuits and sensors for linking the controller to the various stations inside, outside, and around the vehicle. The invented controller may be used with a variety of existing brake systems, by adapting the management mechanism for the particular type of brake system being used.

In an air brake system, the management mechanism is preferably a vented solenoid valve that replaces the conventional loading valve in the air line to the spring mechanism. The solenoid valve cuts off the air supply and vents the air line to release a piston that normally counteracts a spring mechanism, so that the spring mechanism applies the brakes.

When adapted for the hydraulic application brake system, the invented management mechanism may be of two general types: 1) an air, hydraulic-oil, spring, or other actuator that causes the master cylinder to apply the brake; or 2) a pressure generator that is "inserted" between the master cylinder and the brake mechanism and that creates pressure in the brake fluid line to apply the brake. After either type of management system is installed in a hydraulic brake system, the adapted brake system then serves double duty as a "hydraulic parking brake" as well as a hydraulic application brake. The preferred management mechanism adapted for a hydraulic system is of the first type listed above, and comprises a piston or spring that powers a secondary piston rod to move the piston in a master cylinder to apply the brakes. In the case of a spring-actuated secondary piston rod, a release unit such as a piston may be controlled to counteract the spring for releasing the brakes.

When adapted for the mechanical parking brake system (either wheel brakes or drive line brakes), the invented management mechanism operatively connects to the mechanical brake linkage, such as a brake cable. The management mechanism may be, for example, apparatus for air-actuation, hydraulic-oil actuation, spring-actuation or electric-actuation of the mechanical brake linkage.

The various circuits, sensors, and switches included in the invented control system automatically 1) sense conditions, of one or more "stations" in or around the vehicle, that are potentially dangerous if the vehicle moves and 2) automatically signal the controller, which decides whether or not to "trip" the management mechanism to apply the brakes. Such "stations" may be vehicle components, such as the ignition system, the vehicle main door and/or an emergency door, a wheelchair lift, a dump truck bed, a delivery vehicle door, a trailer, a crane boom, outrigger, seat belts, a pressure-sensing operator's seat sensor, tire pressure sensor, engine oil pressure sensor, emissions sensor, air bag sensor, or other vehicle or engine diagnostic sensors that sense and signal the controller when conditions are outside of the normal operating range. Other "stations" may include equipment, objects, or location of people outside a vehicle, for example, that are positioned too near or moving too near to the vehicle in a street, parking lot, loading dock or warehouse. Other "stations" may include test units for driver condition or desirability, such as a breath analyzer, a voice analyzer, or an access-code key-pad, for example.

In general, signals from the various "stations" inside, outside, or around the vehicle to the controller are created by sensors or switches being actuated by the movement of, or the position of, equipment or people, and this actuation signaling the controller, for example, via sensor circuits or other electric or electronic means or other transmission. In some cases, actuation of the sensor or switch at a particular station comprises interruption, either the positive side or the negative/ground side, of the controller circuit including the particular sensor or switch. Various means of switching/sensing may be used, for example, conventional electrical contact, sound-switching, light-emitting-switching, magnetic-switching, fluid, pressure, radar, sonar, microwave, or any other conceivable switching or sensing. When a sensor or switch, or, alternatively, when a certain combination of sensors or switches, is actuated, and the controller decides that conditions are appropriate, the controller "trips" the management mechanism and the management mechanism applies the brakes. As long as the condition causing the "trip" persists, the brakes remain locked in the applied condition in most circumstances. For example, a switch may be operatively connected to a handicapped lift system, and the switch may be electrically/electronically connected to the invented controller, so that using the lift opens a circuit to the controller, which trips the management mechanism to apply and lock the brakes. Once the lift system is not in use, the driver may release the brake. Likewise, a switch may be operatively connected to a door, and the door switch may be electrically/electronically connected to the invented controller, so that opening the door breaks its sensor circuit and trips the management mechanism to apply and lock the brakes. Once the door is closed, the driver may release the brakes. For simplicity hereafter and in the claims, the term "sensor" may be used to indicate any sensor or switch at a "station" that is actuated by conditions at the station to signal the controller.

A preferred feature of the preferred invented control system is that loss of power to the management mechanism causes it to apply and lock the brake. In the especially-preferred embodiments, any time that power is removed from the control module (the "controller"), power is also removed from the management mechanism and the brakes are applied. The positive power input for the preferred controller is activated by either direct or indirect operation of the ignition switch of the vehicle. Therefore, turning the vehicle ignition to the "OFF" position deactivates the controller and the management mechanism to apply the brakes.

The preferred brake control system also includes a sensor and logic for preventing automatic application of the brake if the vehicle is in motion above a certain speed. This feature of the invented control system may be adapted to interface and cooperate with various designs of speedometers, such as magnetic, electrical, or electronic sensor types, or other means for measuring vehicle motion or speed. For example, a conventional speedometer magnetic pick-up may be used to signal the controller for this purpose.

The preferred brake control system also includes features that improve operability in substantially all vehicles, specifically, a signal qualifying circuit and noise suppression functions. The preferred signal qualifying circuit detects the presence of a constant voltage maintained for a minimum duration of time, in order to verify that a signal to the controller is "real," that is, it is not a signal created by a jiggling of a switch, electric noise or other false signals. Alternatively, a qualifying circuit may also use other measurements, such as frequency, to verify true signals. The noise suppression functions may be affected by a combination of various transient suppression inductors, capacitors, diode and surge protectors.

The preferred operator switch is an electric/electronic switch that is used in various scenarios. First, the operator may apply the parking brake when desired, at times when it is conventional to apply the brake, such as in a parking lot, with the main difference being that the operator needs only to touch the "apply" button of the switch rather than pulling a hand-handle or pushing a foot pedal. Secondly, after the operator has applied the brake or the controller has automatically applied the brake in response to one or more sensors signaling an unsafe condition, the operator may then use the operator push-button switch to release the parking brake as long as there are no unsafe conditions still being signaled. Thirdly, the preferred brake control system includes a brake-releasing override system to override the controller's application of the brakes, during emergencies and/or at the driver's discretion. For example, if the invented controller applies and locks the brakes when the vehicle is still in traffic, the driver may use the brake-releasing override to release the brake for enough time to move the vehicle to the side of the road. The manual brake-releasing override may include, for example, the driver pushing and holding the release button on the operator switch while driving the vehicle to safety. This way the driver must use one hand to steer while keeping the other hand on the release button, applying constant pressure on the release button. A driver is unlikely, therefore, to use this override except in emergencies.

Some embodiments of the brake control system separate the controller system from the actuation system, to use space more efficiently and to improve response time. The invention maintains all equipment that must be accessed by the driver in a convenient and safely-visible position in the cab, while placing "remotely" the equipment that mechanically or fluidly communicates with the brakes. More specifically, the preferred "controller system" comprises the operator switch, lights or other indicators, and a controller, and is located at or near the cab, in a position where the driver may access the operator switches and see the indicators. The controller system may be compact, especially if the controller is solid-state and/or microprocessor-based. The switching and indicator lights may be small as well, so that the overall size of the controller system takes up only a few cubic inches of volume at/under the dashboard. The controller, operator switch and indicator lights may be provided in a single housing that may be installed at the dashboard.

In such a remote system, the preferred "actuation system" (also called herein "management system") is located more distantly, preferably away from the dashboard. Between the controller system and the management system are signal means such as electrical connections, data connections, fiber optics, wired or wireless communications and/or other means for sending actuating signals from the controller to the management system to apply the brakes or release the brakes. Thus, electronic/electric/optic/wireless or other signaling means travels between the cab and the brake management equipment but these signaling means are much more compact and more easily routed or transmitted through a vehicle than the conventional air/hydraulic lines. Most preferably, some or all of the communication, between the motorized vehicle and the towed vehicle being pulled by the motorized vehicle, regarding the parking brake is done by wireless means. That is, the preferred signals from sensors on the towed vehicle to the controller in the cab are preferably all sent by wireless means, and the commands from the controller to the management system on the towed vehicle are preferably all sent by wireless means. This way, regarding the parking brake system according to this invention, the driver does not have to struggle with repeated connection and disconnection of wired or other hard connections between the vehicle cab and the trailer or other towed vehicle, greatly improving the reliability and convenience of the parking brake system for the towed vehicle.

Preferred embodiments of the remote system include a controller at the dashboard, and a brake management system located at or near the firewall of the engine compartment, or even further from the cab of the vehicle in preferred positions near the brakes, axle, or differential/transfer case. In towed vehicle embodiments, the controller system is located near the driver in the towing vehicle, and the management system is location near the brakes and wheels in the towed vehicle. In air parking brakes, for example, these invented arrangements may allow a substantial reduction in the length of the parking brake air lines, and may move the brake management system and air lines out from under the dashboard to a less crowded location.

In a first preferred embodiment, the controller system is located under the dashboard very near the dashboard surfaces. Electrical/electronic connections are supplied from the controller system to the management system that is at the firewall of the vehicle engine compartment. Fluid line connectors extend from the management system through ports in the firewall. The fluid lines, therefore, need only extend to the firewall and not into the cab underneath the dashboard, and the space underneath the dash is therefore not cluttered and crowded with air lines.

In a second embodiment, the controller system is again located under the dashboard very near the dashboard surfaces. Electrical/electronic connections, fiber optics, wireless signals, or other signaling means are supplied from the controller system to the management system that is near the brakes themselves, preferably at the axle or transfer case at the axle. Thus, the signaling means extend the long distance from the cab to, for example, the rear axle for engagement of the rear brakes.

Another benefit of the remote system may be that it may allow the air solenoid valve to be combined in a housing with other air valves needed for vehicle operation.

In vehicles containing an air parking brake, the management system comprises a vented solenoid valve, replacing the conventional loading valve in the air line to the spring mechanism. The vented solenoid valve, however, is not placed where the conventional loading valve has been placed for years (under the dash) but rather is placed a distance from the dashboard, for example, at the fire wall or, more preferably, at the axle or transfer case near the wheels and their brakes. Such a "remote" system will allow bus air lines, for example, to be shortened from 30+ feet to 5 feet or less.

In other types of brake systems, again the controller system (controller, and its associated equipment, the manual switch and indicator(s)), are preferably placed at the dashboard or near the driver's hands or feet, and the management system is distanced from the controller and associated equipment. The various brake systems and vehicle manufacturers will have their preferred arrangements, but the general rule of separating the controller/manual switch/indicator from the management system will provide much more flexibility and options for better vehicle and cab design and for faster brake actuation. Preferably, the management system is distanced at least 2–4 feet from the controller system, and, more preferably, from 5–30 feet from the controller, depending whether the management system is actuating or controlling the parking brake, or front or rear foundation brakes.

Optionally, the brake control system may automatically apply the brakes according the invention in response to signals relatively far from the vehicle and the controller, instead of from signals on the vehicle or on the towed vehicle. For example, the brake control system may be adapted to receive signals transmitted from trains or other large equipment that indicate that the train/equipment is approaching. In the case of a train, all trains may transmit on a particular frequency that is set aside for rail road crossing safety, so that, when the controller's receiver picks up that signal from any train, the controller automatically triggers the management system to apply the brake. The invented brake control system could be adapted so that the signal is detected only within 50 feet, or even a shorter distance such as 10 feet, to prevent the unnecessary and confusing result of vehicles being braked when they drive along-side a rail-road but are not in danger. When a vehicle is within 10 feet of a moving train, however, the parking brake should be applied generally under any circumstance. The brake control system could be adapted to even bypass the vehicle motion override system, to prevent vehicles from racing across the crossing in front of the train. Also, the validation time for a train signal could be set very low, for example, 0.5 second. Alternatively, a train warning system could be set up so that a satellite/GPS system calculates that a vehicle is dangerously close to a train or other large moving equipment and sends a signal to the brake control system to apply the brakes of that particular vehicle. Such rail-road crossing systems could drastically cut the number of deaths per year from car-train and bus-train accidents.

Another optional but beneficial feature of some embodiments of the invention is an adaptation that allows the parking brake to be automatically applied slightly before the vehicle transmission is put in "park." Such a system could time the application of the brakes so that the wheels, and therefore the vehicle, are truly stopped and kept from moving a second or fraction of a second before the pawl moves into place in its "parking" location of the transmission. This prevents the pawl from actually being the member that stops the vehicle's motion, and prevents the situation in which a driver "throws" the transmission into "park" before motion is completely stopped, and either damages the pawl or wedges the pawl in a position with too much force against it. Thus, this invented features may prevent damage to the pawl, to the transmission, and may especially prevent the situation in which the pawl cannot be removed from the park location (shifting from park is not possible) because the pawl is wedged/jammed into place with too much force against it (caused by transmission movement after the pawl moves into place) and cannot be moved. Such a system is made possible and practical when parking brake actuation is made to have little lag, delay time, as is the case with the invented "remote" management system and its short fluid lines. Preferably, the invented brake control system applies the parking brake immediately before the pawl moves into park position in the transmission, which means that the parking brake is typically completely applied within less than 1 second, and more likely, less than 0.5 seconds, before the pawl is in the park position in the transmission.

DETAILED DESCRIPTION OF THE INVENTION

Figure 1:
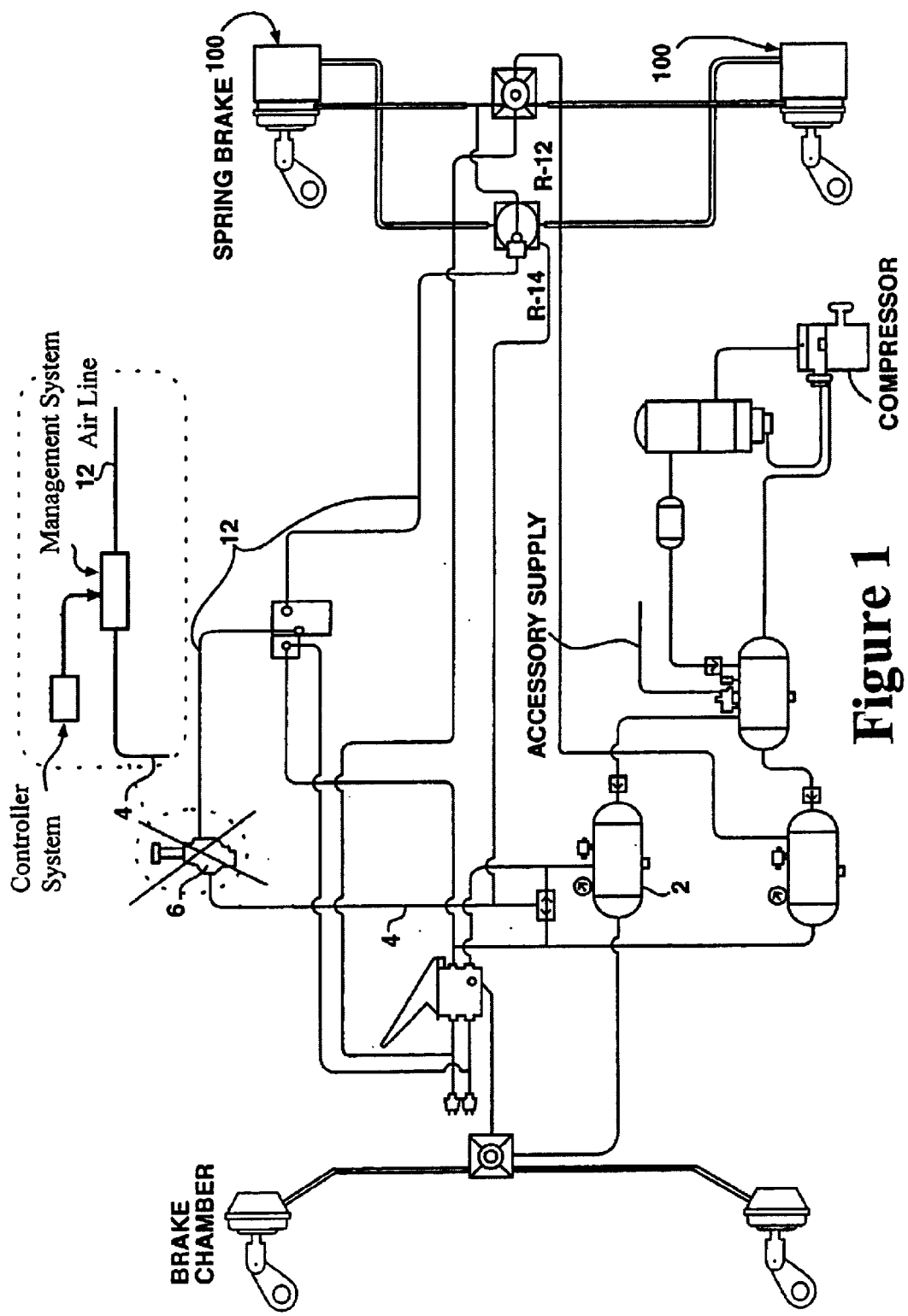
FIG. 1 is a schematic drawing of a conventional bus air parking brake system, in which an air loading valve with a manual handle is at the dashboard of a vehicle, and the air lines extend on the order of 30 feet to the parking brakes at the rear of the vehicle.
Figure 2:
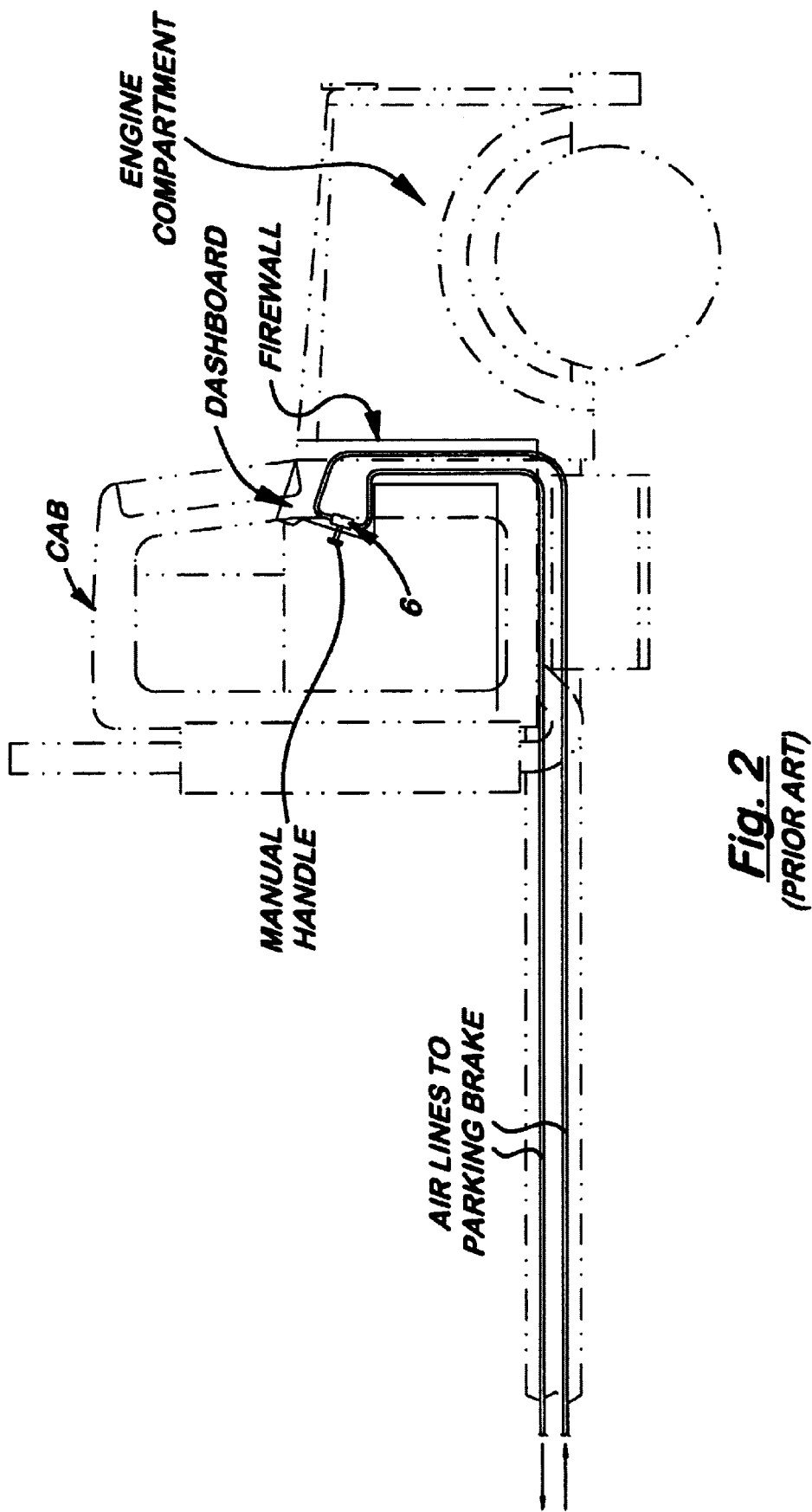
FIG. 2 is a schematic drawing of a prior art loading valve and mechanical handle configuration for a bus parking brake.

Referring to the Figures, there are shown prior art systems and several, but not the only, embodiments of the invented brake control system. FIGS. 1 and 2 illustrates schematics of one type of bus air parking brake system, including the conventional loading valve 6 that has been used for many years, closely underneath the dashboard so that the loading valve handle may extend through the dashboard to be reached by the driver. Air lines in the conventional system extend all the way to the spring units at the wheels, which may involve many feet of air lines and, hence, delays in brake actuation and increased possibility of damage of the air lines. This conventional placement of the loading valve (also called "push-pull" or "PP" valve) and its manual handle result in the air lines 4, 12, in effect, extending through the vehicle cab because they must come within a few inches of the dashboard.

Figure 3:
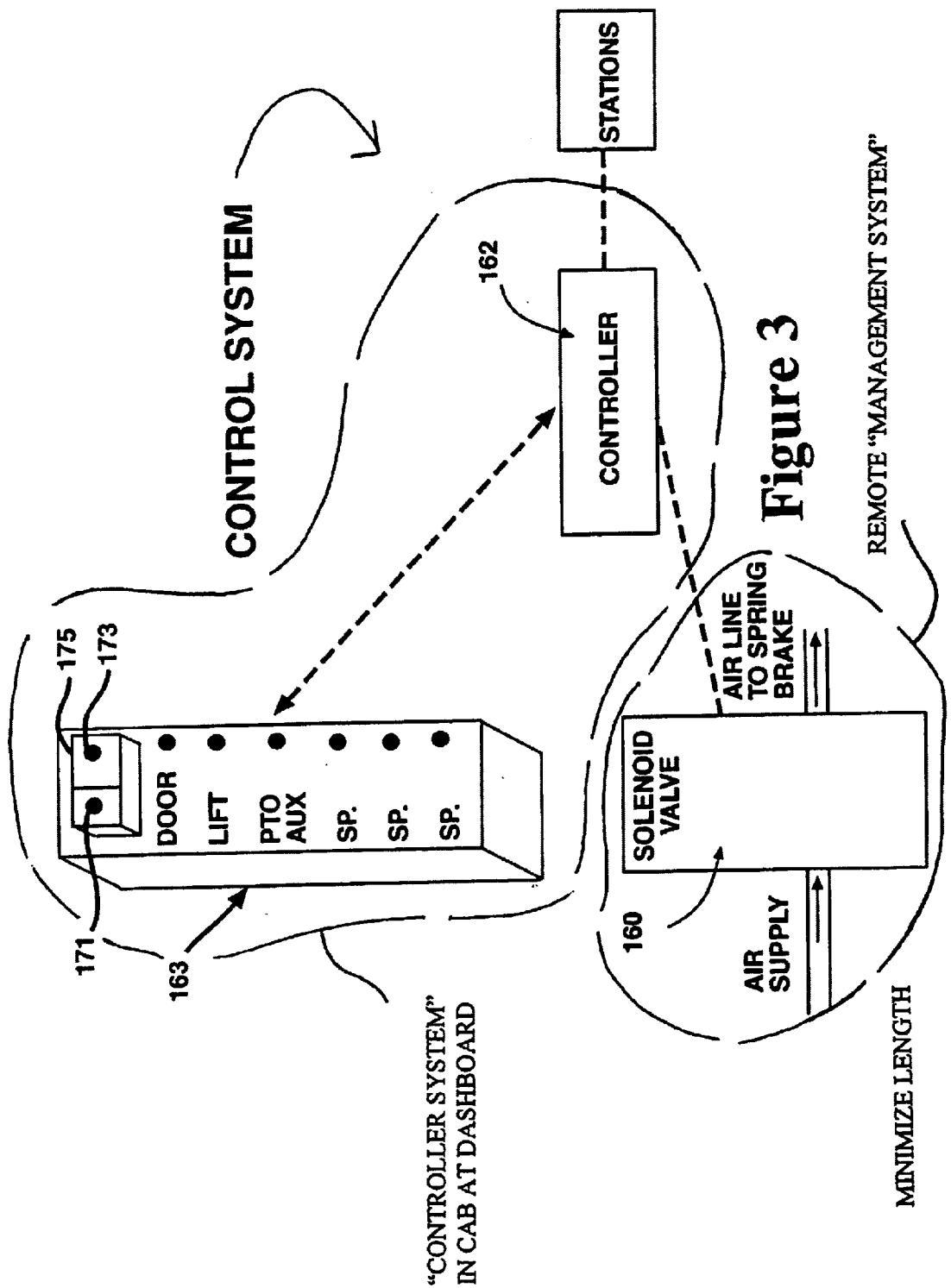
FIG. 3 is a schematic drawing of one embodiment of the invented brake control system, which comprises a controller system in a vehicle cab and a management system over the brakes and wheels.

In FIG. 1 is shown schematically the invented brake control system that may replace conventional systems such as the old loading valve 6, to improve vehicle safety by providing an automatic parking brake feature and to improve the ergonomics of operating a parking brake. In FIG. 1, the dotted line around the conventional loading valve denotes that it may be replaced with the preferred invented brake control system, so that, instead of a loading valve with its push-pull handle, the invented control system is used to apply and control the parking brake. As suggested in FIG. 3, the invented control system preferably comprises a controller 162, an operator switch 163, and wired or wireless connections to management system and to the sensors that signal the controller.

Figure 4:
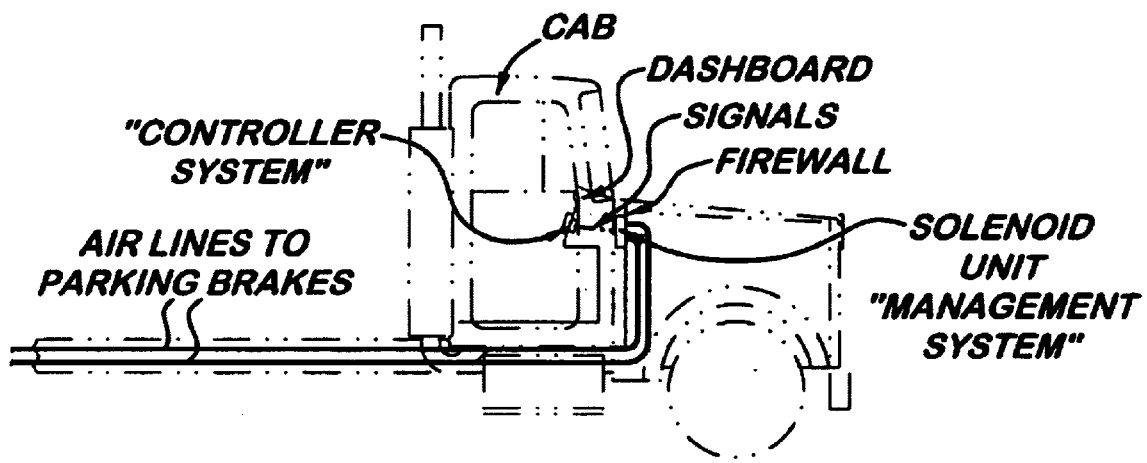
FIG. 4 is a schematic drawing of a first preferred embodiment of the invented remote system for brake control, showing air line ports that may extend through the fire wall.
Figure 5:
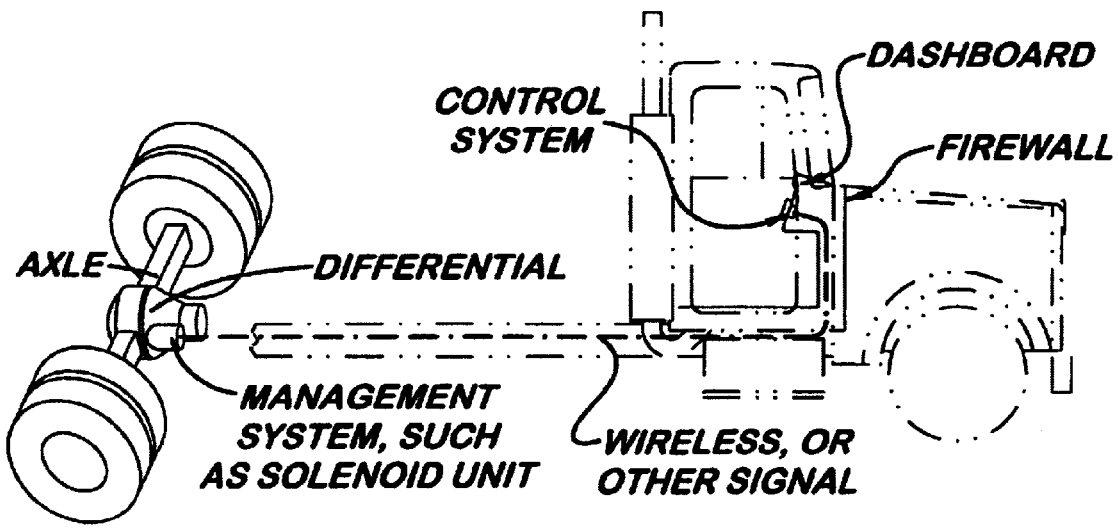
FIG. 5 is a schematic drawing of a second preferred embodiment of the invented remote system for brake control.

In the preferred embodiment, as illustrated in FIGS. 4 and 5, a controller is supplied, preferably with a manual operator switch for emergencies and indicator lights, on or directly underneath the dashboard. From the controller are signal lines (either electronic/electric, fiber optic, or wireless communication) but preferably not air lines. The signal line(s) extend or transmit to a remote management mechanism or "management system" that is closer to the brakes being controlled. At a minimum, the management system is located away from the dashboard near the firewall, as in FIG. 4. In FIG. 4, the management mechanism is placed on the firewall, with ports accepting the air lines. Here, the air lines do not extend to the dashboard, nor into the cab, so crowding under the dashboard is prevented.

More preferably, and especially for towed vehicles, the management system is located far away from the dashboard and the controller, for example, very distant from the dashboard, preferably at or near the axle of the wheels being slowed or stopped by the brakes, as in FIG. 5. The management mechanism may be a solenoid air valve at or near the differential or transfer case. In such a case, the signals or signal lines travel all the way from the control system in the cab, but the air lines do not. This way, air lines only a few feet long (for example, about 2–4 feet long, rather than 20–30 feet) may be installed, thus, saving on equipment, on possibly-damaged or leaking lines, and on delay in braking caused by turns or bends or extra length in air lines. The preferred "actuation system" (also called herein "management system") is located away from the dashboard and most preferably within about 2–5 feet of the brakes at the wheels. This way, airlines or hydraulic lines in a hydraulic brake system should preferably each be less than about 5 feet long.

An adaptation for the management unit at the very distant location or at any non-cab location is to have a heat source or other adaptation to prevent any freezing/icing of the valve or the lines in the valve, and/or to prevent freezing of the parking brake in the on position. Because the solenoid valve is not in the heated cab during cold weather, a heat source may be supplied. This may be done by sizing the solenoid coil sufficiently large and of such a design that, because electricity goes through it during normal operation of the vehicle, there is enough resistance that heat is produced in sufficient quantity to heat the valve and prevent freeze-up. Other heating systems may also be used to prevent brake freeze-up, such as heating at the wheels.

Especially-preferred embodiments of the invention relate to parking brake systems for vehicles that are towed by a powered vehicle, which may be recreational vehicles such as $5^{th}$-wheels, trailers of tractor-trailer combinations, or other typically non-powered vehicles. For convenience, we refer hereafter to these units as "trailers." More particularly, the invented control system automatically applies and "locks" a brake on the trailer in an applied condition during times when it is not safe for the trailer to move, that is, when it is not safe for the driver to hook up with the trailer and pull away. The invention may prevent much damage of property, both the trailer and bridges, buildings, or other property. Also, this invention will help prevent unsafe use of the trailer or "run-away" or stolen trailers or equipment. Particularly, the invented brake control will signal and lock/apply the trailer brake(s) when an extension such as a slide-out or stabilizer is extending out to the side or down to the ground, respectively. Or, the brake will automatically be applied or locked on when entry steps are not stowed, when tire pressure is low, when stoves or water heaters are not in a safe travel arrangement, when a hitch or connection to the towing vehicle not properly set, or some other piece of equipment is not in proper position for movement.

The invented brake control system may include a controller according to the above-cited patent applications, and the controller may be on either the towing vehicle or the trailer. The controller receives signals of unsafe conditions in the trailer via circuits or other non-wire signal means, processes the signals and actuates the brake management on the vehicle.

Preferably, the power source for the controller is power from the towing vehicle or from the power source on the trailer, if there is one. The invention may be adapted for either manual brake, air brakes, or hydraulic brakes on the trailer. The invented system preferably does not add a power source to the trailer, except in some instances a mechanical, spring or lever operated actuator for a brake for instances where the power source in the towing vehicle is likely to be disconnected from the towed vehicle or for instances in which the trailer normally only has a manual brake. The invented system preferably does not interfere with the normal braking action of the towed device or the towing vehicle when in motion and in safe operating condition.

Examples of implementation are:

When towing vehicles is hooked up to the trailer, the invented system will keep the brakes on the trailer applied if any "unsafe signals" are fed from the trailer to the invented controller—that is, for example, if any extensions are still out, steps are down, other equipment not properly stowed or positioned, or tire pressure not adequately. In such an implementation, power may be supplied to the controller by the towing vehicle, and the normal brake system of the trailer may be adapted to cooperate with the controller. When the towing vehicle and trailer are hooked up together, the brake should be operable by the normal means, for example, air or hydraulic means, so that a new brake mechanism need not be added to the trailer.

The invention may also be adapted for implementations where the power source is cut off, that is, where the towing vehicle is disconnected and the trailer does not have its own power source, and does not have its own air or hydraulic fluid source for the brakes. In such examples, the invention may include a spring-actuated electric brake or other spring-actuated brake, so that the brake is not released until the towing vehicle is reconnected to the trailer and until no "unsafe signals" are received by the controller. In other words, this type of embodiment of the invention may be in safe mode each time the trailer is disconnected from its towing vehicle and also when any extensions are out, any equipment un-stowed, tire pressure low, etc. The invention in these cases, therefore, would include the addition to the trailer of a brake actuator having a mechanical component, such as a spring-actuated brake or manual-actuated brake, to allow actuation (continual actuation) of the trailer brake until all the safety conditions are met.

Figure 6:
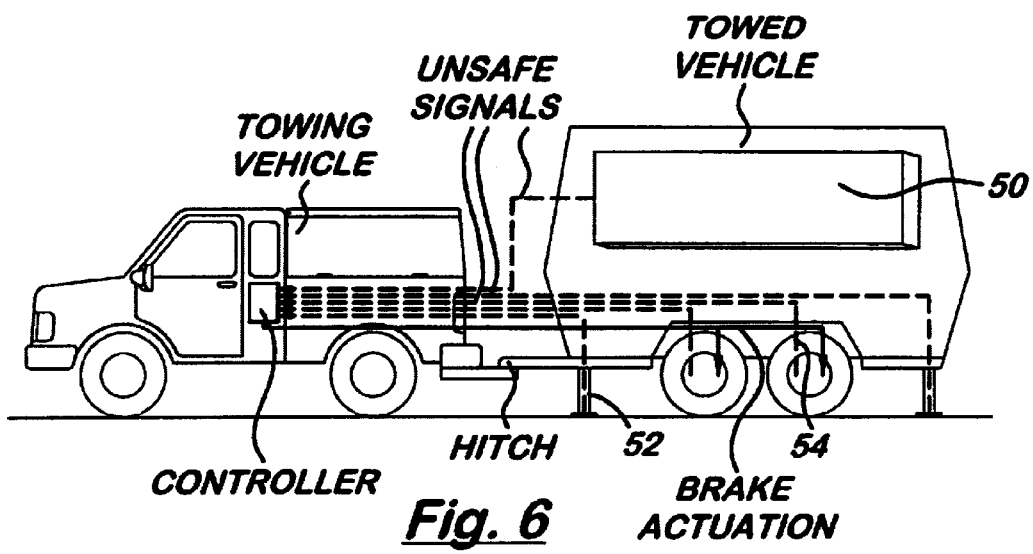
FIGS. 6 and 7 illustrate remote systems wherein equipment or tire conditions on a towed trailer cause trailer brake actuation.
Figure 7:
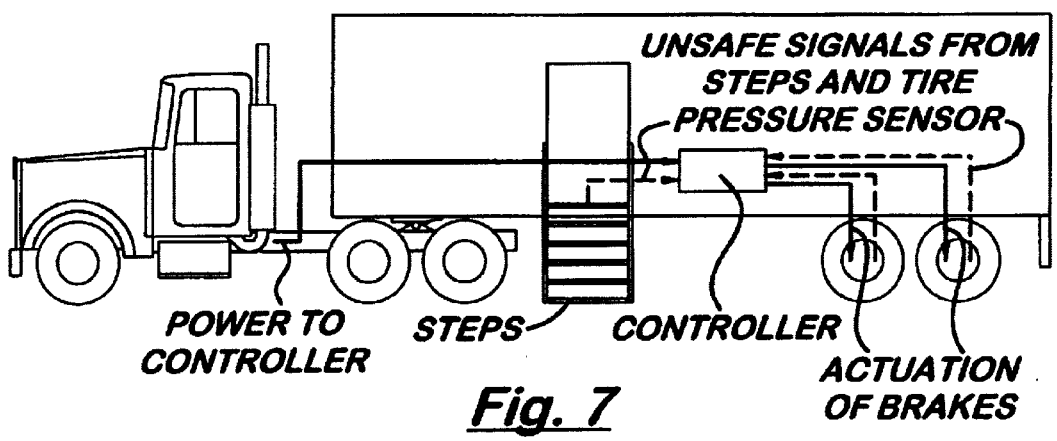

FIG. 6 is a side schematic view of a towing vehicle and a recreational vehicle with one embodiment of the invention, with the controller in the towing vehicle. In FIG. 6, a "slideout" 50 of a recreational vehicle is sensed as being out, a stabilizer 52 is down, and a tire is sensed 54 as being at low pressure, so the controller is applying the trailer brake. FIG. 7 is a side schematic view of a vehicle and trailer with the controller in the trailer, and with unsafe signals from tires and steps causing the controller to apply the brakes of the trailer.

Figure 8:
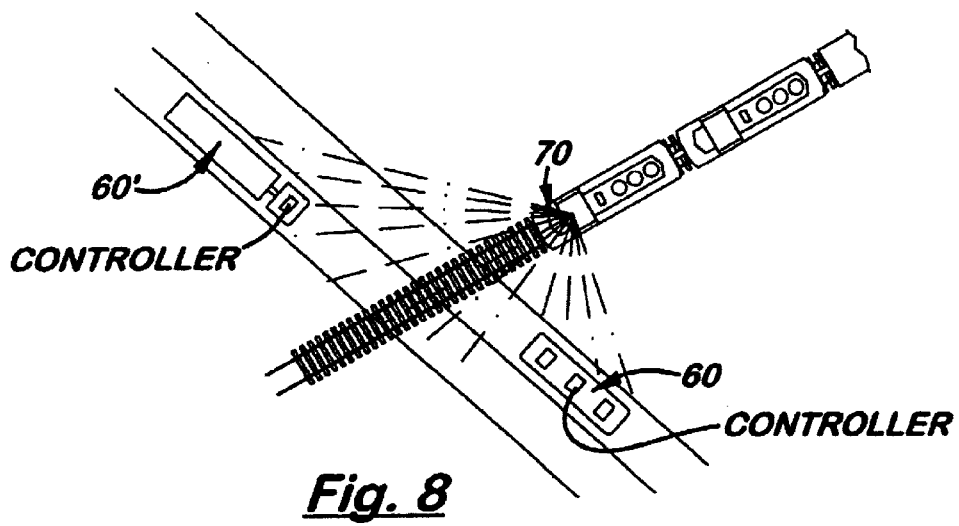
FIG. 8 is a schematic view of an embodiment in which a vehicle is braking because it is approaching a moving train.

FIG. 8 illustrates vehicles 60, 60' that were approaching a moving train 70, but that are now braked because of a signal from the train to the invented controller.

Solid-state brake control systems are especially preferred embodiments of the invention, as they may include many safety features and many data ports for sensing conditions at various stations in and around the vehicle. An example of a solid-state brake control system, according to the invention, includes a solenoid valve, a solid-state controller, and an operator control switch mounted in a chosen convenient position. These three main components are operatively and electrically/electronically connected to perform the required and desired methods of applying and locking a parking brake. Preferably, the invented control system should be compliant with all required Federal Motor Vehicle Safety Standards and compatible with the existing brake and ABS brake systems. One solid-state brake control system is described below:

Given the description and drawings contained herein, one skilled in the art may see how a brake control system including a solenoid valve unit 160 with a solid-state electronic controller 162 (FIG. 10) may have advantages in size, reliability, versatility, and adaptability to many different vehicles. The controller 162 is designed to receive and process the signals from a plurality of sensors/switches at the various stations, and, appropriate, to signal the management systems that manage either air, brake fluid, hydraulic fluid, mechanical, or electric devices to cause application of the brakes. For example, in air parking brake applications, the management mechanism is a solenoid valve that closes and vents; in hydraulic brake applications, the management mechanism is the pressure generator and associated valving that is inserted between the master cylinder and the brake mechanism, or an actuator that causes the master cylinder to create pressure; or, in a mechanical brake application, the management mechanism is an air, hydraulic, spring, or other unit that connects to and operates the mechanical linkage to the brake mechanism.

The controller 162 is operatively, and preferably also physically, attached to the management mechanism. Alternatively, the controller 162, solenoid 160, and operator switch 163 may be separate structures electrically/electronically connected.

The controller 162 may be a printed circuit board, which may include some imbedded microprocessor chip(s), or may be a substantially microprocessor design. The printed circuit board and/or microprocessors may be manufactured according to conventional circuit board and/or chip manufacturing techniques once the invented apparatus, circuits, and methods described and drawn herein are understood. Optionally, the controller may include memory to record the control events that take place over time, for example, to create a safety record or operator driving performance record.

Figure 10:
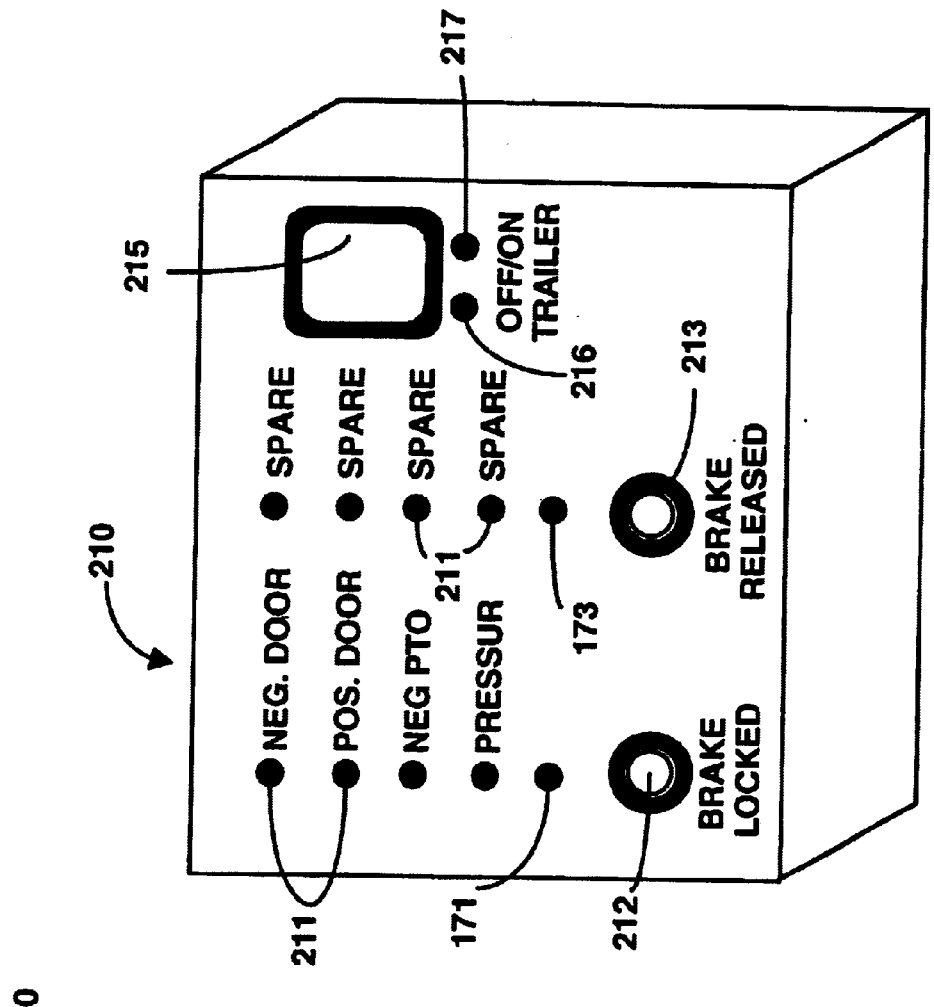
FIG. 10 is another embodiment of an operator switch according to the invention.
Figure 9:
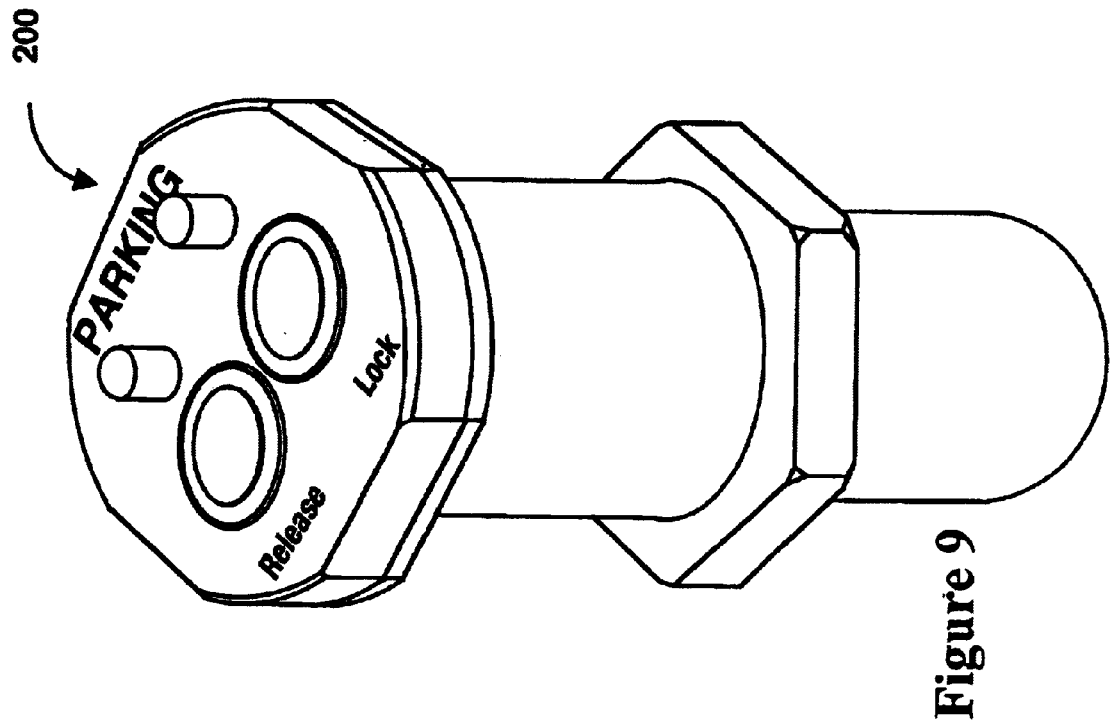
FIG. 9 is one embodiment of an operator switch according to the invention.

Preferably, the operator switch includes manual switch buttons that are referred to herein and in the drawings as either "actuate" and "dictate" switches or buttons, or "brake locked" and "brake released" switches or button. Preferably, the operator switch also includes indicator lights and labels for each station, indicating which station is causing the engagement of the brakes. See, for example, the operator switches of FIGS. 9 and 10. FIG. 9 illustrates an operator switch 200 which replaces the conventional manual brake knob that bus operators have used for so long. FIG. 10 illustrates a more complete operator switch 210, of the type that may include, for example, rows of red LED lights 211 labeled "Door," "Lift," "PTO/Aux," "Spare," etc, positioned near the "activate 212 deactivate 213" switch with red indicator 171 and green indicator 173, which switch is discussed below, and an optional trailer brake control 215 and red and green indicator lights 216, 217. Optionally, liquid crystal, TV, or monitor technology may be used to provide text, symbolic, or other indicia or visual representations to educate the driver or other observer about the existing conditions.

Figure 11:
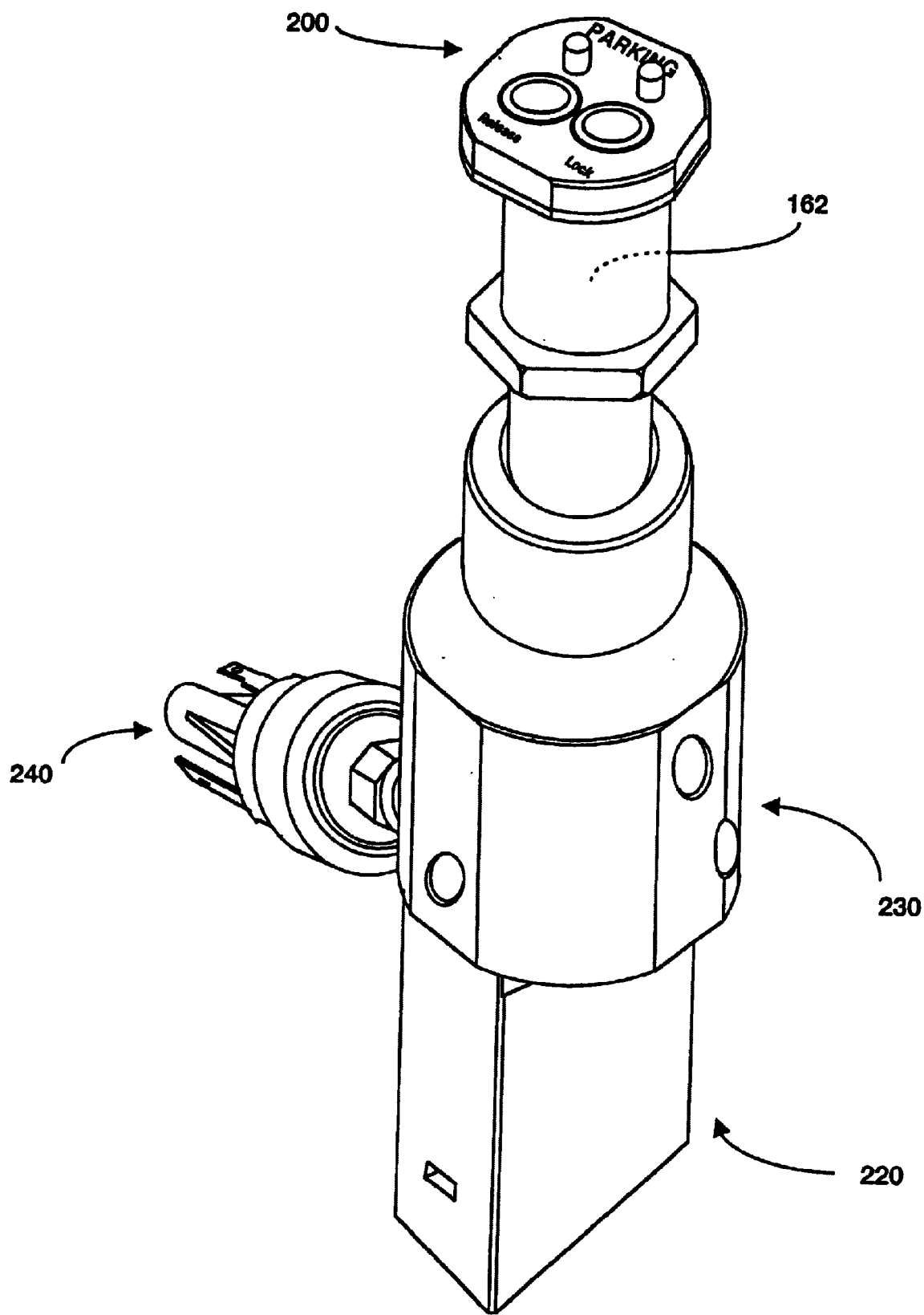
FIG. 11 is an embodiment of a controller system which combines a controller in a single unit with an operator switch.

Optionally, the controller 162 may be placed inside the operator switch body, providing a compact combination controller-switch-valve unit as is illustrated in FIG. 11. The combined unit shown in FIG. 11 includes operator switch 200 which encloses a microprocessor controller 162 inside its body. The switch 200 operatively connects to a solenoid-controlled air valve (solenoid portion 220 and air valving portion 230). A low pressure switch 240 is shown attached to the side of the air valving portion 230.

Preferably included in the solid-state embodiment are the following features, described for an air parking brake embodiment:

Solenoid Operation

1. The solenoid employed in this design places the vehicle air-disengaged/spring-engaged parking brakes in the applied position whenever the solenoid is not energized, that is, when current is not passing through the solenoid coil from the control unit.

2. The controller is designed so that, upon the vehicle ignition being turned on, the controller automatically powers up in a state in which the brakes are locked. Thus, the system does not require any manual application of the brakes by the operator when the vehicle is first started. A red indicator light 171 shows that the brake is applied when the vehicle starts up.

3. Releasing the brake may be done by momentarily placing the "activate/deactivate" momentary switch 175, which may be located on the combined switch/display box 163, in the activate position. This causes the electronic control circuit to latch DC ground to one side of the air brake control solenoid. The other side of the solenoid is electrically wired to the +12 DC side of the vehicle's electrical system. It may be noted that alternative embodiments may be adapted to other than a 12 volt system.

4. Manual or other release of the brake may not be done, and the red indicator will continue to flash, if the vehicle's supply air pressure is less than a predetermined set point pressure. (See Low Pressure Detection, below).

5. This latching energizes the solenoid and releases the brakes. This action is indicated by the controller turning off the red indicator light and turning on a green indicator light 173. This latching action releases the vehicle parking brakes for normal usage.

6. As long as the solenoid remains latched, the brakes will remain in their normal operating state. This condition will remain this way until the controller is electronically or manually reset (de-energized) in one of the following manners:

a. Manually placing the "activate/deactivate" switch into the "deactivate" position; in this case, deactivation takes place nearly instantly. This places +12 v on a controller connector input pin that instantly resets the control circuit and de-energizes the solenoid. This function is not over-ridden by the speedometer input function; it is active whether or not the vehicle is stopped or in motion. In other words, the operator can manually apply the brakes whether or not the vehicle is in motion, giving the operator control in an emergency.

b. If the low air pressure switch closes.

c. If a door switch, that has its contacts normally open, closes (because the door is opened). This control input is only active when the vehicle is not in motion.

d. Optionally, if any other stations to which a particular controller is operatively connected signal the controller that a condition exists that warrants application of the brakes. For example, such stations as a "PTO/aux." (power take off/auxiliary) switch, a wheelchair lift switch, or other described elsewhere in this Description.

Preferably, in the case of the above operations, the controller is designed so that the signals of any of these sensors/switches must remain non-interrupted for predetermined amount of time, for example, in the range of 0.5 to 2 seconds, and more preferably in the range of 0.5 to 1.25 seconds, to validate their operation before the controller applies the brakes. Once the brakes are applied because of these signals, the brakes remain applied in the locked state until the potentially unsafe condition has been eliminated and the brakes are then released by the driver releasing the brakes with his/her manual control switch. If the potentially unsafe condition has not been eliminated, the driver, in an emergency, the driver may manually release the brake by using the manual brake-releasing override for a short period of time to move the vehicle to safety.

More specifically, in the especially-preferred control system:

Low Pressure Detection

The especially-preferred controller is set up to detect the opening of a normally closed pressure switch. This pressure switch, set to open when the air pressure falls below the pressure set point (typically approximately 35 pounds per square inch) is placed in series with the control system solenoid coil. Thus, it may be seen that preferably only the electronic controller and the pressure switch control the flow of electrical current to the solenoid. When the air pressure falls below approximately 35 psi, and this pressure switch opens, current is broken to the control solenoid and this action applies the air brakes in the locked position. The controller senses this and responds by resetting all of its control latches such that the brakes can not be released until the air pressure is restored to over 35 psi.

Likewise, the controller also senses whether or not this air pressure sensor is open or closed when the vehicle is first started. If the air pressure is below 35 psi on start up, the controller unit will not allow any type of brake release, including the operators manual release switch, until 35 psi air pressure exists.

Initial Power Up

Specifically, upon application of the vehicle DC power to the preferred controller, the following functions take place, regardless of the state of any of the sensor inputs to the controller.

(1) Capacitors begin charging throughout the entire controller, two of which are specifically placed in series with Resistors to perform these two initial functions:
   (a) Power On Reset pulse to initiate the start up latches in their reset mode the solenoid latch circuit;
   (b) A pulse that sets the second latch to reinforce the cutoff state of the first latch.

(2) As a result of the action of the two above noted pulses, the system is automatically forced into the "Brakes Locked" state. The only means of releasing it from this state is with the operator manual brake-releasing override but that too is conditional to operating air pressure being above a set minimum value. The controller responds as follows:
   (a) If the air pressure is below 35 lb. per square inch, all air brake solenoid release functions are blocked by the control unit. Furthermore, when the air pressure is below this 35 psi, a set of contacts, wired in series with the power leads to the air brake solenoid, are in the open position, further preventing current flow in the solenoid. This state will remain in effect until such time as the air pressure has exceeded the 35 psi minimum and has closed the pressure switch that is in series with the power lead going to the solenoid.

The operator of the vehicle is alerted to this low pressure condition by the flashing state of the red light emitting diode lamp located in the operator's switch and indicator housing. This indicator lamp remains in flashing mode, of approximately 4 Hertz and approximately a 50% on/off duty cycle, as long as the air pressure is less than 35 psi. Once the air pressure is up to correct level, the lamp ceases to flash and switches to a steady ON state, notifying the operator that they can now release the air brakes.

(b) If the air pressure is above the 35 psi minimum after initial power up of the controller, the red LED indicator lamp will initially turn on in the steady state, notifying the operator that working air pressure exists in the air brake system. The system will now permit release of the air brakes, but only by the operator release switch. When the operator depresses and releases his manual release switch, the two latches, that are used to initially place the brakes in the locked position on power up, are then set in the "brakes released mode", and power is supplied to the air brake control solenoid by a translator switch within the controller. In general, the air brake solenoid allows the brakes to be released only when power is applied to it. Any event that results in interruption of the current path to or from the solenoid will result in the brakes being locked.

Sensors Operations

The especially-preferred controller makes use of two different types of sensor input lines.

(1) Six input lines that are active when connected to vehicle negative ground side of its electrical system;

(2) Two dedicated function (passenger door) sensors, one that is active when connected to the positive side of the electrical system, the other active when connected to the negative side of the vehicle electrical system. These two inputs are unique from the other six input lines in that, upon their release from their respective active sides, they cause the air brake to automatically release, whereas all the others require that the operator depress and release the manual release switch.

The system is not limited to these six negatively active inputs or just the one positively active door input. An infinite number of additional lines of the same type may be connected to either or all of them, provided caution is exercised to prevent dead short current loops on negative inputs and that one uses input codes on the positive door input to isolate the positive inputs form one another.

Sensor Signal Validation Circuit

To provide a measure of protection against false setting of the brakes caused by noise, a "loose" switch, a defective switch, and etc., a circuit has been included in the controller that requires that a sensor signal be present, without interruption, for a predetermined minimum time, for example, a minimum time set between 0.5 to 1.25 seconds, before it will recognize it a valid signal and latch the brakes. Thus, if the minimum time is set at 1 second, the signal must be present without interruption for at least 1 second before it is recognized as a valid signal.

This delay time is common to all sensor inputs except the low pressure sensor, which is instantaneous and can only exist when the pressure switch has indeed opened from lack of pressure.

Vehicle Motion Detection

The especially-preferred control system contains circuits that detect, amplify, and then validate signals electrical signals that are generated by various means when the vehicle is moving.

Once the system has validated the input signal, a "override" signal is generated by the motion detection circuits and is routed to the sensor validate circuit, which blocks any of the other sensor from applying and locking the brakes. Once this motion over-ride signal is present, the only means of over-riding its lock out of setting the brakes is the use of the operators manual release switch, or of course, the vehicle coming to a halt.

There are two validation circuits used in this section of the controller unit. First, the signal must be present, uninterrupted, for approximately 1 to 2 seconds before it qualifies as a legitimate signal. This limits the possibility of the brakes being set by short duration noise picked up from the vehicle.

In addition to this 1 to 2 seconds validation time, the signal must be of sufficient amplitude to cause the circuits non-inverting amplifier to rise above a trip point that is adjusted to be slightly above vehicle ground potential.

An example of an electrical signal that may be generated when the vehicle is moving is a magnetic pulse generator that may drive a vehicle's electrically operated speedometer. In such an embodiment, the controller senses the output of the transmission pulse generator when the vehicle is in motion, without causing error in the vehicle speedometer. Preferably, this vehicle-motion monitoring system is designed to sense the rotational speed of the transmission output shaft, and any rotation greater than a desired value overrides the application of the brakes except when the brakes are applied by the manual operator's "activate/deactivate" switch. The vehicle-motion monitoring system is preferably compatible with either non-grounded or grounded speedometer systems. An option for some vehicles is to provide a four-wire motion detection sensor, as opposed to a two-wire sensor, for the speedometer pickup circuitry. This four-wire option may assure greater accuracy of the speedometer and, therefore, the motion over-ride system of the invention.

The threshold of speed above which the controller will not apply the brakes may be set differently for different vehicles and locations. For example, a threshold in the range of about 5–10 miles per hour may be desirable for passenger vehicles, while a threshold in the range of about 2–5 miles per hour may be desirable for school busses, for example.

Other signals from the vehicle may be used for signaling the controller that the vehicle is in motion. For example, the controller may be adapted to respond to Hall Effect, optical, infra-red, or other signals that are generated by and sent to the speedometer via a vehicle's primary computer system.

Power Supply and Input Line Noise Suppression and Protection

The input power to the unit from the vehicle +12 vdc electrical system is passed through both a common mode inductive/capacitive filter, as well as transient protection devices limiting the input voltage spikes to 18 volts maximum.

The controller logic section is somewhat electrically isolated from the power required to run the brake solenoid valve by the use of an isolation diode. This is further supported by a number of various values of electrolytic capacitors connected between the +12 v reference voltage and ground at strategic points in the circuits.

The integrated circuit input lines from the off-board sensors have both diode and resistive protection in accordance to manufactures recommendations for them. This same protection scheme is also employed on the input lines from the operators manual control switches.

Thus, the controller is designed to suppress and/or eliminate momentary voltage excursions, both within and exceeding the normal positive and negative limits of the primary operating power source, that can cause damage and/or improper operation of any electronics circuits attached to the primary operating system.

Manual Control Functions

The manual control assembly contains two color coded push button switches and two correspondingly colored light omitting diodes (LEDs) which provide the operator a visual indication of what state the air brakes are in, preferably, green for released and red for locked.

The two switches, when active, place +12 v Ref (the working protected voltage for the controller, not raw vehicle +12 v) on the inputs to the two latches that either release or lock the brakes. Both the release and the lock inputs have an 11 ms validation time to prevent short duration positive noise spikes from releasing the brakes.

Automatic Audio Device Cut-Off

The controller optionally provides logic and output line to operate an exterior relay that may cut power to any sound-producing equipment whose power source is routed through it. This radio-cutting feature is restricted to the two different polarity door sensor input lines as this function is demanded only when the passenger entry-exit door is opened, for example, for listening for trains or traffic.

The controller contains provision on the negative and the positive door sensor circuits to power both an external optional relay and a corresponding indicator LED. When this option is used, activation of this relay by either of these two sensor input lines will break operating power to any audio device that is connected through it to vehicle +12 v.

Physical Size

The size of the solenoid, operator switch, and solid-state controller preferably are each less than 10"×5"×5", and maybe any size needed for a particular vehicle. Optionally, the controller may be made small enough, by microprocessor technology, to fit inside the operator switch.

ABS Compatibility

The solid-state control system includes a two-way check valve between the air supply and the solenoid valve, for compliance with ABS requirements resulting from the use of a primary air source and a secondary air source. The check valve, or "shuttle valve," may be included in the invented control system, for replacement of the loading valve in vehicles in which the conventional air loading valve was designed in the past to include the check valve. For vehicles in which the check valve remains as apparatus separate from the conventional air loading valve, then removal of the loading valve and replacement by the invented control system does not require the control system to include a check valve.

Control Unit Connections

Connections to and from the control unit electronics assembly are preferably standard automotive connectors as designated by the vehicle manufacturer. Preferably, the control input lines are to be contained on one connector, while the other connector serves for the output lines to various LED lamps and for the +12 v DC and ground connections to power the electronics. Note that alternative embodiments may be adapted to other than 12 volt systems, or as customer-preferred.

Provisions have been made on the "input" side connector for a source 12 v battery and ground, so if at sometime an input interface requires power, it will be available. These two connectors will be of different genders so as to provide protection from unintentional mix up during installation.

Auxiliary Input and Output Lines

Optionally, the control system may be designed to accommodate as many additional inputs as is practical with regards to its impact on printed circuit size and cost. Alternative embodiments, especially micro-chip technology, may include many data ports, including parallel and serial ports.

Auxiliary input lines preferably will respond to inputs that are either switched to ground or to +12 v of the vehicle electrical system. Preferably, if some type of vehicle sensor is employed that does not provide switching to either ground or +12 v of the vehicle electrical system, the conversion to this type switching will have to take place exterior to the designed control circuit, ie. via addition of a switch.

Operating Voltage and Current Handling Limitations

Nominal operating voltage for the preferred system is 10.8 to 13.8 volts direct current. Preferably, the solenoid output leads are limited to de current loads, ground sourced, of not less than 18 ohms continuous operation at a direct current voltage of not more than 13.8 volts. In the especially-preferred embodiment, the maximum allowable auxiliary power connections are limited to not more than 0.5 amps at 13.8 amps with the brake solenoid energized.

Transient Protection

Transient and over-voltage protection of the circuit may be provided by the strategic placement of various chokes, transient suppresser diodes, filter capacitors, diodes and surge protectors, as would be found necessary and appropriate in view of accepted adequate design practices, once the disclosure of this Description if viewed by one of skill in the art.

Battery Connection Reversal Protection

A 3 amp 200 v diode will be provided in series with the main +12 v battery connections to the unit.

Internal and External Fusing

Operating instructions for the unit will require the use of an external fuse of a maximum amperage rating of 2 amps at 32 volts DC. Internal to the unit, and connected in series with the drain of the pass element transistor, shall be another fuse, rated at 3 amps at 32 volts D.C.

Operating Temperature Range

The desired operating temperature window of the brake control system is from approximately 32 degrees Fahrenheit to approximately 125 degrees Fahrenheit.

Schematics of Solid-State Embodiment Logic and Wiring

Figure 12:
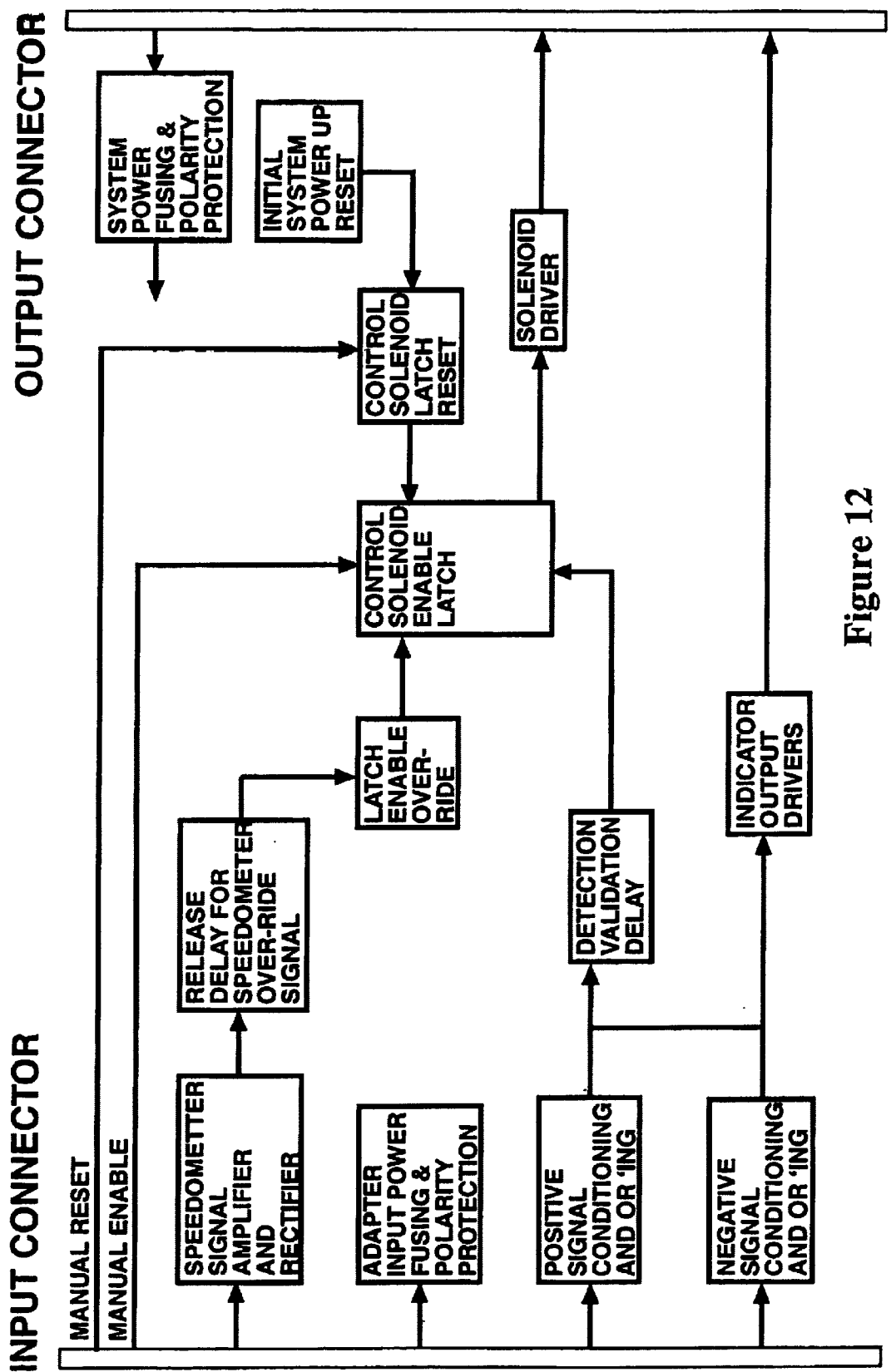
FIGS. 12 and 13 are schematics of one solid-state embodiment logic and wiring.
Figure 13:
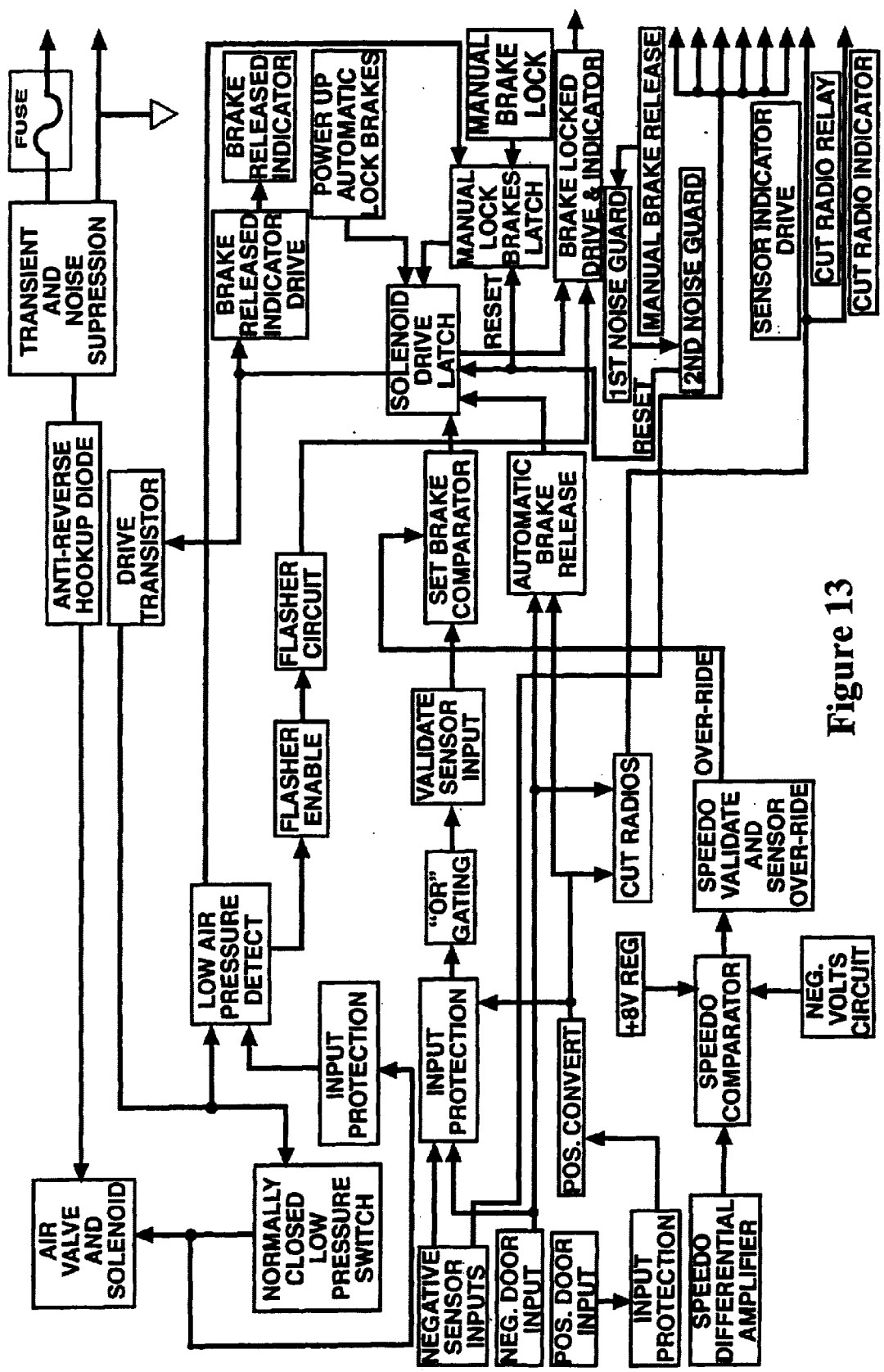

The logic and functions of one solid-state embodiment are portrayed in FIGS. 12 and 13. The controller preferably has burned-in memory so that, when the vehicle engine is off and, therefore, the ignition system does not provide power to the invented unit, battery power is not needed to maintain the memory in the controller and the control system does not drain the vehicle's battery.

Although this invention has been described above with reference to particular means, materials and embodiments, it is to be understood that the invention is not limited to these disclosed particulars, but extends instead to all equivalents within the scope of the following claims.

We claim:

1. In a vehicle comprising a motorized vehicle with a driver's cab and a towed vehicle being pulled by the motorized vehicle and having a parking brake, a brake control system comprising a controller system and a management system, the controller system comprising:

sensors located on or near the vehicle comprising sensors that are located on the towed vehicle;

an electronic controller located in the driver's cab adapted to receive signals from a plurality of sensors that signal conditions unsafe for vehicle movement on or near the vehicle, the controller adapted to command the management system to apply the parking brake when one or more of said sensors signal unsafe conditions;

an electronic operator switch located in the vehicle cab and accessible to a driver of the vehicle, the operator switch having an apply-brake position and a release-brake position and operatively connected to the controller to communicate apply-brake and release-brake commands to the management system via the controller; and the management system located in the towed vehicle comprising means for applying the parking brake in response to apply-brake signals from the controller and for releasing the parking brake in response to release-brake signals from the controller;

wherein said sensors on the towed vehicle signal the controller by means selected form the group consisting of electrical connections, electronic connections, data connections, fiber optics, wireless transmissions, and combinations thereof;

wherein the controller communicates with the management system by means selected from the group consisting of electrical connections, electronic connections, data connections, fiber optics, wireless transmissions, and combinations thereof;

wherein the motorized vehicle does not have a hand or foot operated parking brake handle in the cab that is mechanically linked to the parking brake.

2. The brake control system of claim 1, wherein the parking brake is a spring-operated air parking brake and the management system comprises a solenoid air valve at or near wheels of the towed vehicle and air lines to and from the solenoid air valve that do not extend to the motorized vehicle.

3. The brake control system of claim 1, wherein the parking brake is a hydraulic parking brake and the management system comprises a hydraulic cylinder at or near the towed vehicle wheels and hydraulic lines from the hydraulic cylinder that do not extend to the motorized vehicle.

4. The brake control system of claim 2, wherein said air lines are each less than 5 feet long.

5. The brake control system of claim 3, wherein said hydraulic lines are each less than 5 feet long.

6. The brake control system of claim 1, wherein the controller system is adapted so that, when the parking brake has been applied by the management system due to the controller sending an apply-brake commend to the management system in response to unsafe signals from one or more sensors, the apply-brake command is overridden when the said operator switch is manually held in the release-brake position by the driver's hand while the vehicle is driven to safety.

7. The brake control system of claim 1, wherein said sensors on the towed vehicle signal the controller by wireless communication and the controller commands the management system by wireless communication so that the vehicle does not comprise a wired connection between the motorized vehicle and the towed vehicle for parking brake operation.

8. The brake control system of claim 1, wherein the controller further comprises a validation circuit that validates each unsafe signal from the plurality of sensors by requiring that the unsafe signal continue uninterrupted for at least a minimum amount of time before the controller reacts to the validated signal to command the management system to apply the parking brake.

9. The brake control system of claim 8, where said minimum amount of time is in the range of 0.5 to 2 seconds.

10. The brake control system of claim 1, wherein the operator switch is a push-button switch comprising two separate buttons that are an apply-brake button and a release-brake button.

11. The brake control system of claim 1, wherein the controller system is adapted so that the driver moving the operator switch to the apply-brake position causes the controller to command the management system to apply the parking brake even if no unsafe signals are being sent to the controller from said sensors.

12. The brake control system of claim 1, wherein the controller system is adapted so that the driver moving the operator switch to the release-brake position causes the controller to command the management system to release the parking brake only if no unsafe signals are being sent to the controller from said sensors.

13. The brake control system of claim 1, wherein, when unsafe signals to the controller cause the parking brake to be applied, the controller system is adapted to be overridden to release the parking brake by the driver continuously applying pressure on the operator switch in the release-brake position, so that the driver may drive the vehicle until the driver releases the pressure on the operator switch.

14. The brake control system of claim 1, wherein one of said sensors signaling the controller to apply the parking brake is a train transmitting a signal that is receivable by the controller when the vehicle is within less than 50 feet of the train.

15. The brake control system of claim 1, wherein one of said sensors signaling the controller is a train transmitting a signal that is receivable by the controller when the vehicle is within less than 10 feet of the train.

16. The brake control system of claim 1, wherein one of said sensors signaling the controller comprises a transmission system signaling the controller that the transmission is being put in a park condition, wherein the controller responds to the transmission system signal by commanding the management system to apply the parking brake.

17. The brake control system of claim 16, wherein the controller commands the management system to apply the brake in response to the transmission system signal and the management system applies the parking brake before a pawl of the transmission system moves into its park position in the transmission.

18. The brake control system of claim 17, wherein the parking brake is applied less within 1 second of the pawl moving into the park position.

* * * * *